April 21, 1931.    C. J. DORRANCE    1,802,006
SHOCK ABSORBER AND SILENCER
Filed Jan. 6, 1930
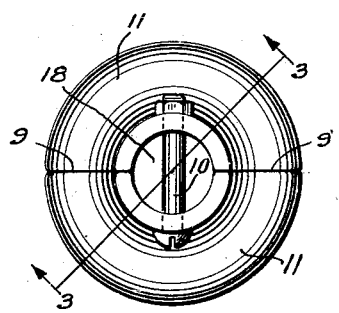
FIG. 2.
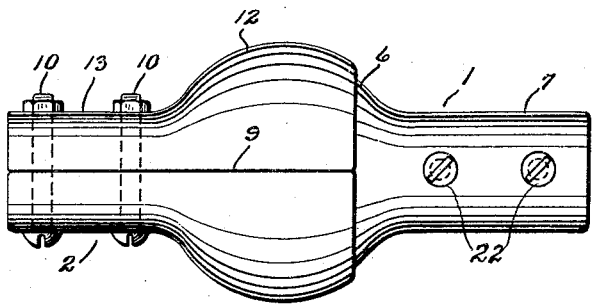
FIG. 1.
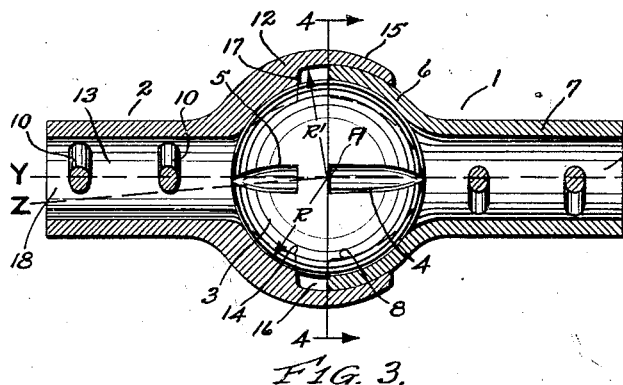
FIG. 3.
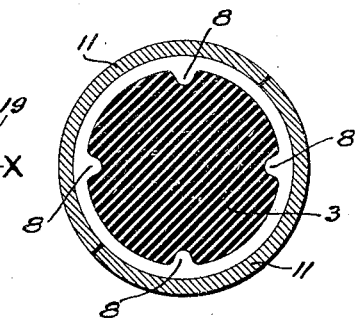
FIG. 4.
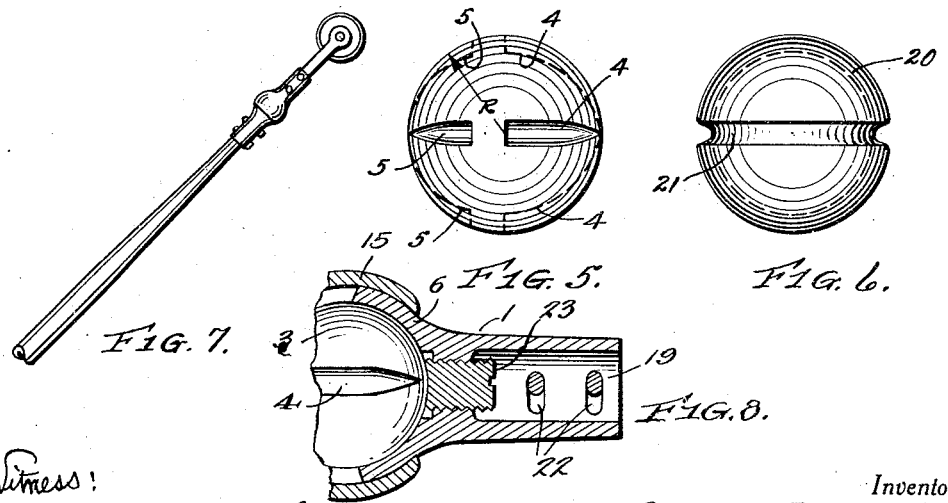
FIG. 7.   FIG. 5.   FIG. 6.
FIG. 8.
Witness:
H. J. Stromberger
Inventor
CHARLES J. DORRANCE
By
Attorney Patented Apr. 21, 1931

1,802,006

UNITED STATES PATENT OFFICE

CHARLES J. DORRANCE, OF CHICAGO, ILLINOIS

SHOCK ABSORBER AND SILENCER

Application filed January 6, 1930. Serial No. 418,752.

My invention relates to shock absorbers and silencers for use in connection with trolley poles and current collectors.

The object of my invention is to provide a means to be interposed between the end of a trolley pole and the current collector to absorb a part of the mechanical vibrations or movements usually present where the trolley collector is rigidly attached to the pole and another object of my invention is to provide a yielding joint between the pole and current collector to reduce shock upon the overhead system. Another object of my invention is to reduce the amount of sound vibration which may be transmitted from the trolley wire to the car roof through the medium of the trolley pole. Another object is to maintain a better and more constant contact between trolley wire and wheel.
Other objects of my invention will be apparent from the disclosures hereinafter made.

My invention resides in the new and novel construction, combination and relation of the various parts hereinafter described and shown in the accompanying drawing.

In the drawing:—

Fig. 1 is a longitudinal side view of my invention.
Fig. 2 is an end view of Fig. 1.

Fig. 3 is a longitudinal view in partial section taken on the line 3—3 of Fig. 2.

Fig. 4 is a transverse section taken on the line 4—4 of Fig. 3.
Fig. 5 is a resilient spherical member and shown in Fig. 3.

Fig. 6 is a modified form of the spherical resilient member shown in Fig. 5.

Fig. 7 is a longitudinal view of my invention shown in combination with a trolley pole and current collector.

Fig. 8 is a modification showing means to adjust the pressure of the parts relative to each other.
In the preferred embodiment of my invention I employ two body members, 1 and 2, made of metal such as malleable iron or bronze and a third member, 3, formed of a yieldable deformable material such as soft vulcanized rubber.

The member 3 formed into the shape of a sphere is provided with grooves 4 and 5 with the inner ends of the grooves spaced apart and forming abutments. The resiliency of the member 3 may be varied by changing the composition of the compound of which the member is made and in the rubber art the development is so highly advanced at the present day that the proper degree of yieldability is easily secured and I find that rubber is one of the best materials to embody.

The member 1 comprises a cup-shaped portion 6 and a stem portion 7. The cup-shaped portion 6 is made to enclose substantially one-half of the member 3 and is provided with inwardly projecting ribs 8 which may be of any number and spaced around the inner surface of the portion 6 and interfit with the grooves 4 thus locking the member 1 with respect to the member 3 against relative rotation about the axis or an angular movement of the axis relative to the member 3 excepting as may be allowed by the yieldability of the member 3.

The member 2 is shown as made of two longitudinal members split on the line 9 and held together by means of the screw and nut 10. The longitudinal members 11 when positioned together form a part having a cup-shaped portion 12 and a stem portion 13. The cup-shaped portion 12 is provided with a plurality of ribs 14 around its inner surface which interfit with the grooves 5 and relative movement of the parts 2 and 3 is resisted the same as with respect to the parts 1 and 3. The portion 12 is provided with an extension 15 which overlaps the diametrical center line and has its inner surface formed by the radius R', interlocked with the outer surface of the portion 6 of member 1. The outer surface of the portion 6 is also formed with the same radius R' and when the members 1 and 2 are assembled they may move relative to each other as is the case with a ball and socket joint, in fact, the movement is universal. In order to permit a reasonable amount of relative angular movement of the parts about the common center A an annular space 16 is provided and the amount of movement may be limited by the width of the space 16 through the engagement of the end of the portion 6 with the face 17 of the member 2.

It will be apparent that when the members 1, 2 and 3 are assembled as described and the parts 11 held in fixed relation by means of screws 10 that the parts 1 and 2 will have a common axis XY and yieldingly maintain that relation as long as no stress is placed upon the parts 1 and 2 but if stress is applied to the parts 1 and 2, then the axis will assume the position represented by the line XZ but as soon as the stress is removed the elasticity of the member 3 will immediately return the parts 1 and 2 to their aligned position.

The member 2 may be made of a single piece if desired in which case the lip portion 15 will be originally formed with straight sides in place of curved and after the parts are assembled the lip will be rolled in by methods well known to those skilled in the art.

As the current from the collector to the car must pass through the device, the contact between the portions 6 and 15 will readily perform this function and the elasticity of the member 3 will tend to hold the surfaces continually in contact.

I find that the member 3 being made of a material which will absorb in place of transmitting sound vibration that such vibration will be absorbed to a large degree by the member 3 and only a very small portion will pass from the member 1 to the member 2 through the contact of the member 6 with the member 15.

Further, when the device is in use interposed between a current collector and a trolley pole the upward pressure of the trolley pole will cause the members 1 and 2 to yield relatively to each other depending upon the stress and the resistance to yielding by the member 3. This yielding of the parts 1 and 2 I find to be very important for the reason that the movement of the trolley pole is not all transmitted to the current collector which is presumed to maintain constant contact with the trolley wire but considerable of the movement of the trolley pole is taken up in my invention thus tending to stabilize or maintain uniform the contact between the current collector and the trolley wire and this constant contact reduces arcing which in turn reduces burning of the trolley wire and trolley wheel, thus increasing materially the life of both.

Also dewirements of the current collector will be materially reduced in number because the severe and excessive movement of the trolley pole will not be entirely transmitted to the current collector.

The trolley pole end may be inserted within the cavity 18 of member 2 and the current collector support inserted in the cavity 19 of member 1 and held by the screws 22, or vice versa.

My device may be used for other purposes, than that just described, where a universal joint is required with internal means for yieldingly resisting relative movement of the parts or where such internal means is formed preferably of a rubber sphere.

In Fig. 6 the sphere is formed with circular grooves 20 and 21 which are shown at right angles to each other but any number of such grooves may be employed and in Fig. 6 they are shown as of uniform depth while in Fig. 5 they are shown tapering in depth.

The members 1 and 2 move relative to each other about the common center A which is located on the common axis XY and rotate about the common axis XY and in one direction longitudinally but such movements are yieldingly resisted by the member 3 and longitudinal movement in the other direction is prevented by the members 1 and 2 contacting and the movement about the common center A is limited by the edge of member 1 engaging edge 17 of member 2.

Modifications will suggest themselves to those skilled in the art after my disclosures and therefore I wish to be limited only by my claims.

The pressure between the member 3 and parts 1 and 2 may be varied by a short screw plug 23 at the inner end of the stem 7 which can be forced into engagement with the member 3 to force it inwardly.

I claim:—

1. A trolley pole attachment comprising, a plurality of co-operating metallic members in direct electrical contact and each having an enlarged cup-shaped end which together form a complete receptacle, a part of the enlarged end of one member overlapping the enlarged end of the other member and holding the member against separation and forming an electrical connection and allowing freedom of movement of the members about a common center also along their longitudinal axis in one direction and limited in the other direction and a body of elastic insulating material within the receptacle and interlocked with the members.

2. A trolley pole attachment comprising a plurality of co-operating metallic members and having enlarged ends which together form a receptacle with a part of one enlarged end overlapping the enlarged end of the other member and holding the member against mechanical separation and in electrical engagement and permitting universal movement of the members about a common center, a body of elastic deformable material within the hollow of the receptacle and interlocked with the members, means on one member to receive the end of a trolley pole and means on the other member to receive a current collector support.

3. An article of manufacture comprising a plurality of co-operating metallic members having enlarged ends which together form a receptacle with a part of one enlarged end overlapping the enlarged end of the other member and holding the members against mechanical separation and in electrical contact and permitting relative freedom of movement about a common center, one of the members having its enlarged end split longitudinally and means to hold the split parts together, a body of deformable material within the hollow of the receptacle and interlocked with the members to yieldingly resist the said relative movement and biased to hold the longitudinal axis of the members in alinement and separate means to attach each member to supports.

4. An article of manufacture comprising a plurality of co-operating metallic members having enlarged ends which together form a receptacle, a body of elastic material within the hollow of the receptacle and interlocked with the members to yieldingly resist relative movement of the members about a common center and external means connecting the members mechanically and electrically and permitting relative movement of the members about a common center.

5. An article of manufacture comprising a plurality of co-operating metallic members having enlarged ends which together form a receptacle, a body of elastic material within the hollow of the receptacle and interlocked with the members to yieldingly resist relative movement of the members about a common center and external means connecting the members mechanically and electrically and permitting relative movement of the members about a common center, one of the members split longitudinally and having means to hold the split parts together.

6. An article of manufacture comprising a plurality of co-operating metallic members having enlarged cup-shaped ends which together form a receptacle having a spherically shaped recess, a body of elastic material and of spherical shape within the recess and interlocked with the members to yieldingly resist relative movement of the members, means to connect the members together mechanically and electrically and permit relative movement of the members.

7. A universal joint comprising a plurality of co-operating metallic members having enlarged cup-shaped ends which together form a receptacle having a spherically shaped recess, means connecting the members electrically and against separation in a longitudinal direction, a spherically shaped member of elastic material positioned within the recess, means projecting into the recess and interlocked with the said spherical member to yieldingly resist the relative movement of the members about a common center.

8. A universal joint for a trolley pole comprising, a plurality of co-operating metallic members having enlarged cup-shaped ends which together form a receptacle having a spherically shaped recess and having also spaced edges to permit relative movement of the members about a common center, a spherically shaped body of elastic material positioned within the recess, means on each member to receive a trolley pole and a current collector respectively, projecting means on the members to engage in recesses in the spherical body to yieldingly resist relative movement between the spherical body and each member and relative movement between the members and means to hold the members and body in assembled relation.

9. An article of manufacture comprising a trolley pole, a current collecting device, means for securing said pole and device together comprising a part to be attached to the pole, a part to be attached to the collecting device, a ball shaped cushion of elastic material arranged between the parts and external means projecting from one part and overlapping the other part to hold the parts and cushion together to move relative to each other about a common center and rotate relative to each other about a common axis while the cushion yieldingly resists said movements and rotation.

10. A current collector comprising in combination a current collector part having a cup-shaped portion at one end, a part for attachment to a trolley pole having a cup-shaped portion co-operating with the other cup-shaped portion to form a spherical recessed receptacle, means directly securing the parts together and permitting relative rotation about a common longitudinal axis and relative movement about a common center and a spherical member of elastic material within the recess and interlocked with the parts to yieldingly resist said relative rotation and movement.

11. A device to connect a current collector to a trolley pole comprising a pair of metallic members having a common longitudinal axis about which the parts may rotate relative to each other and a point common with the said axis about which the parts may pivotally move relative to each other and transversely to said axis, means to secure the members together and permit said rotation and pivotal motion and an elastic body interposed between the members to yieldingly resist said relative rotation and pivotal movements.

12. An electrical joint comprising in combination, an elastic body, two mechanically interlocked members in direct electrical connection, a fastening portion carried by each member, the members to rotate relative to each other about their common longitudinal axis and the elastic body yieldingly resisting said relative rotation.

13. A universal electrical joint comprising in combination, an elastic body, two mechanically interlocked members in direct electrical contact and enclosing the elastic body, a projecting fastening portion carried by each member, the members to pivot about a common point positioned on the common longitudinal axis of the members and rotate relative to each other about the said axis and the elastic body yieldingly resisting the said relative pivotal and rotational movements of the members.

14. The combination with a trolley pole and a current collector of a universal joint comprising two mechanically interlocked members in direct electrical contact and connected to the pole and collector, a deformable member of elastic rubber yieldably holding the interlocked members in axial alinement and means to vary the pressure of the deformable member relative to the interlocked members.

In testimony whereof I affix my signature.

CHARLES J. DORRANCE.